United States Patent
Bergman et al.

(10) Patent No.: US 9,584,208 B2
(45) Date of Patent: Feb. 28, 2017

(54) METHOD AND APPARATUS FOR UPLINK MULTI-CARRIER TRANSMIT DIVERSITY

(75) Inventors: Johan Bergman, Stockholm (SE); Johan Hultell, Solna (SE); Niklas Johansson, Uppsala (SE); Erik Larsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 996 days.

(21) Appl. No.: 13/256,586

(22) PCT Filed: Oct. 12, 2010

(86) PCT No.: PCT/SE2010/051097
§ 371 (c)(1),
(2), (4) Date: Sep. 14, 2011

(87) PCT Pub. No.: WO2011/046498
PCT Pub. Date: Apr. 21, 2011

(65) Prior Publication Data
US 2012/0002630 A1    Jan. 5, 2012

Related U.S. Application Data

(60) Provisional application No. 61/250,768, filed on Oct. 12, 2009.

(51) Int. Cl.
*H04B 7/06* (2006.01)
*H04B 7/04* (2006.01)
(Continued)

(52) U.S. Cl.
CPC ............... *H04B 7/068* (2013.01); *H04B 7/04* (2013.01); *H04B 7/061* (2013.01);
(Continued)

(58) Field of Classification Search
CPC ........ H04B 7/04; H04B 7/061; H04B 7/0621; H04B 7/0634; H04B 7/068; H04B 7/0691; H04L 5/003; H04L 27/2626
See application file for complete search history.

(56) References Cited

U.S. PATENT DOCUMENTS 5,628,052 A * 5/1997 DeSantis et al. .......... 455/562.1
2002/0025807 A1 * 2/2002 Zimmerman et al. ........ 455/423
(Continued)

FOREIGN PATENT DOCUMENTS

CN       1227683 A      9/1999
CN       101120564 A    2/2008
(Continued)

*Primary Examiner* — Joshua Kading
(74) *Attorney, Agent, or Firm* — Coats & Bennett, PLLC (57) ABSTRACT

A method (400) and apparatus (300) for selecting one of a plurality of antennas (320, 322), on a UE (300) implementing transmit diversity in a multi-carrier wireless communication system, for the joint transmission of two or more uplink signals, each modulated onto a different carrier frequency, such as when the carriers share a power amplifier (314). The method (400) and apparatus (300) select an antenna (320, 322) based on channel conditions associated with the carriers, even when prior art transmit diversity methods provide conflicting antenna selection indications.

14 Claims, 4 Drawing Sheets

(51) Int. Cl.
*H04L 5/00* (2006.01)
*H04L 27/26* (2006.01)

(52) U.S. Cl.
CPC ......... *H04B 7/0621* (2013.01); *H04B 7/0634* (2013.01); *H04B 7/0691* (2013.01); *H04L 5/003* (2013.01); *H04L 27/2626* (2013.01)

(56) References Cited

U.S. PATENT DOCUMENTS

| | | | |
|---|---|---|---|
| 2003/0002594 | A1 | 1/2003 | Harel et al. |
| 2006/0141949 | A1 | 6/2006 | Varshney et al. |
| 2007/0191053 | A1* | 8/2007 | Suzuki .......................... 455/522 |
| 2008/0089296 | A1* | 4/2008 | Kazmi et al. ................. 370/336 |
| 2008/0195748 | A1* | 8/2008 | Tierney et al. ............... 709/232 |
| 2009/0225699 | A1* | 9/2009 | Takagi et al. ................. 370/328 |
| 2010/0113057 | A1* | 5/2010 | Englund et al. ............ 455/452.1 |
| 2010/0177655 | A1* | 7/2010 | Duenyas ....................... 370/252 |

FOREIGN PATENT DOCUMENTS

| | | |
|---|---|---|
| CN | 101536570 A | 9/2009 |
| EP | 1553714 A1 | 7/2005 |
| EP | 2110963 A1 | 10/2009 |
| EP | 2194735 A1 | 6/2010 |
| JP | 2008199423 A | 8/2008 |
| JP | 2009088690 A | 4/2009 |
| JP | 2009529810 A | 8/2009 |
| JP | 2009201167 A | 9/2009 |
| WO | 9749199 A2 | 12/1997 |
| WO | 2006070232 A1 | 7/2006 |
| WO | 2006/096880 A2 | 9/2006 |
| WO | 2007/081181 A2 | 7/2007 |
| WO | 2007081181 A2 | 7/2007 |
| WO | 2008057999 A1 | 5/2008 |

* cited by examiner

METHOD AND APPARATUS FOR UPLINK MULTI-CARRIER TRANSMIT DIVERSITY

TECHNICAL FIELD

The present invention relates generally to wireless communications, and in particular to a method and apparatus for antenna selection in uplink multi-carrier transmit diversity when signals modulated onto two or more carrier frequencies are jointly transmitted on one of a plurality of available antennas.

BACKGROUND

The $3^{rd}$ Generation Partnership Project (3GPP), an industry consortium that defines and promulgates wireless communication network technical specifications, has defined a number of standards, such as High Speed Packet Access (HPSA). 3GPP has introduced multi-carrier operation for the uplink in HSPA. Release 9 of the standard allows for the transmission of two signals, each modulated onto adjacent 5-Mhz uplink carrier frequencies (referred to herein as "carriers") in parallel from the same User Equipment (UE) towards a serving base station (Node-B or eNode-B). Multi-carrier uplink has the potential to substantially increase both user throughput and system throughput. The two-carrier specification is known as Dual-Cell High Speed Uplink Packet Access (DC-HSUPA) operation. Since the carriers are adjacent in the same frequency band, it is technically feasible to transmit signal modulated onto both carriers using a single multi-carrier power amplifier (PA) with twice the bandwidth, which may provide a more economical solution than two parallel, single-carrier PAs. Under normal conditions, the two carriers operate independently from each other; for example each carrier has its own mechanisms for power control, serving grants, E-TFC selection and HARQ retransmissions.

Figure 1:
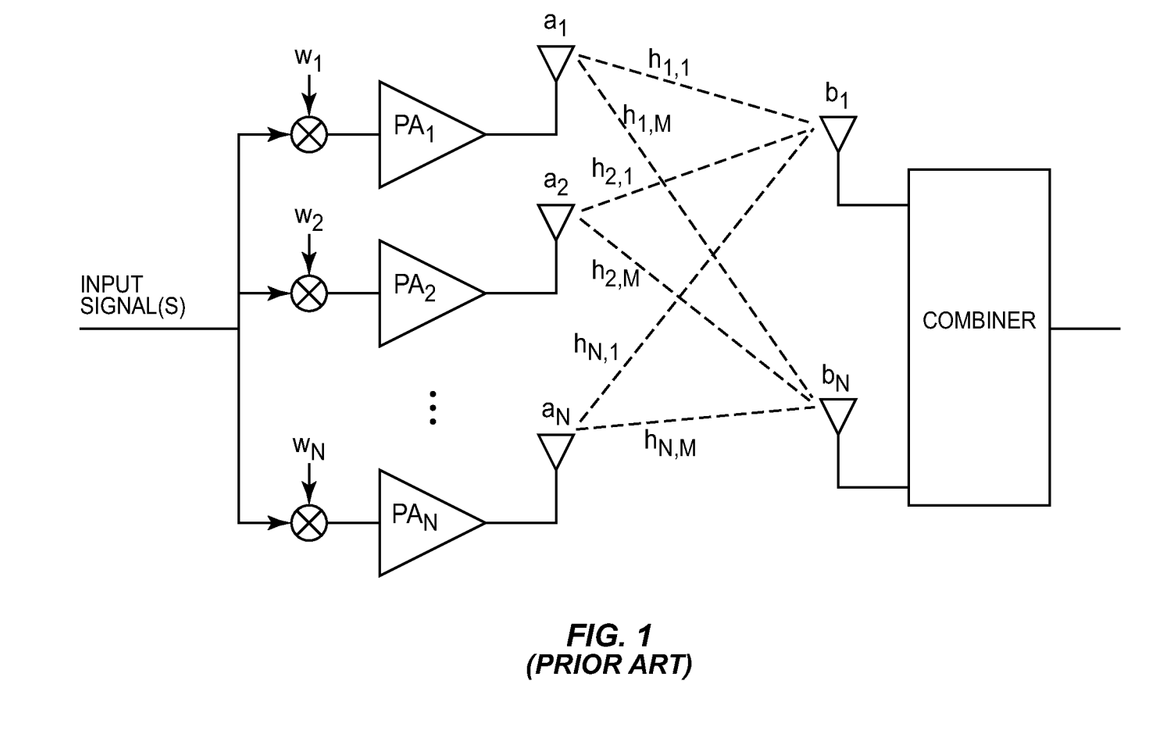
FIG. 1 is a functional block diagram of a transmit diversity antenna array.

The potential benefits of uplink transmit (Tx) diversity in the context of High-Speed Uplink Packet Access (HSUPA) is being evaluated (see, e.g., 3GPP Tdoc RP-090987, 3GPP Work Item Description: Uplink Tx Diversity for HSPA). With uplink transmit diversity, UEs that are equipped with two or more transmit antennas are capable of utilizing all of them. This is achieved by multiplying the uplink signal s(t) with a set of complex weights $w_i$, and transmitting the signal from two or more antennas, as depicted in FIG. 1. Note that i=1 . . . N where N denotes the number of transmit antennas. In general, each path from a transmitting antenna $a_1$ . . . $a_N$ to a receiving antenna $b_1$ . . . $b_m$ will experience different channel characteristics $h_{n,m}$ across the air interface.

The rationale behind uplink transmit diversity is to adapt the weights $w_i$ so that the user and network performance is maximized. Depending on UE implementation, the antenna weights $w_i$ may be associated with different constraints. Within 3GPP two classes are considered: beam forming and switched antenna diversity.

Beam forming is a technique whereby, at any given point in time, the UE may transmit from more than one antenna simultaneously. The name beam forming is derived from the technique of controlling the phase and amplitude of signals transmitted from different antennas to create a pattern of constructive and destructive interference in the wavefront, effectively altering the gain in desired spatial directions. Because differentiated signals are transmitted from different antennas, beam forming generally requires a separate PA to drive each antenna.

In switched antenna diversity, the UE at any given point in time transmits from only one of the antennas. Thus, referring again to FIG. 1, if $w_i \neq 0$, then $w_j=0$ for all $j \neq i$. With switched antenna diversity, a UE may use a single PA, and simply switch its output to the selected antenna. Switched antenna diversity can be considered as a special case of beam forming, where the weight of one antenna is 1 (i.e., switched on) and all others are 0 (i.e., switched off).

In either case, decisions of the use of Tx diversity and the selection of the antenna weights can be taken by the network or the UE.

The Node-B may provide explicit feedback to the UE stating whether Tx diversity should be applied, and if so which weights the UE should use when transmitting the signal. This case requires feedback, and may require the introduction of a new feedback channel.

Alternatively, the UE may autonomously decide whether Tx diversity should be applied. To decide this, the UE may monitor existing indicators and measurements of channel quality, such as the number of required HARO retransmissions, the downlink channel quality indicator (COI), or the UE transmission power headroom (UPH) measurement. For example, if the COI and/or the UPH become low, the UE may conclude that it is in a bad coverage area and that it is likely to be beneficial to activate Tx diversity.

Additionally, the UE may autonomously decide the antenna weights $w_i$. To select the weights $w_i$ the UE may monitor existing feedback channels, including those that are transmitted for other purposes, such as the Fractional-Dedicated Physical Control Channel (F-DPCH). For example, if the UE receives a large number of consecutive Transmission Power Control (TPC) UP commands on F-DPCH from the serving cell, the UE may conclude that it is likely to be beneficial to switch to the other Tx antenna by changing the antenna weights $w_i$.

The fundamental goal of uplink transmit diversity is to exploit the variations in the effective channel. As used herein, the term effective channel incorporates the effects of the transmit antenna(s), transmit antenna weights, and the receiving antenna(s), as well as the wireless channel between transmitting and receiving antennas. In switched antenna diversity, and possibly also in beam forming, the antenna weights $w_i$ are changed abruptly (e.g., if a UE transmitting on antenna 1 switches wholly or significantly to transmitting on antenna 2, then $w_1, w_2$ will change from (nearly) 1,0 to 0,1. Consequently, the effective channel as perceived by the receiving Node-B may change abruptly.

In prior art systems, it has been possible to base WCDMA/HSPA functionality on the assumption that the UEs always are transmitting from one antenna. Consequently, the channel and interference estimates are typically based on a filtered version of the instantaneous channel and interference measured by the Node-B. Hence, whenever the UE changes its antenna weights—and especially if the change is abrupt such as in switched antenna diversity—the channel estimates used by the receiver becomes inaccurate. This reduces the receiver performance. Additionally, uplink transmit diversity results in a discontinuity in received power at the Node-B and a transient that upsets loop power control.

The power discontinuity occurs at the Node-B whenever the effective channel between UE and Node-B changes. This discontinuity will be a combined effect of the facts that the wireless channels between the transmit antennas and receive antenna(s) are different, and that the antenna gains of the two transmit antennas are different.

An antenna switch (or rapid change in the antenna weights) also results in a transient period until the inner-loop power control (ILPC) and outer-loop power control (OLPC) have settled. If the Node-B was aware that the power discontinuity was caused by an abrupt change in antenna weights, it could adjust its behavior thereafter; for example, by freezing the OLPC.

Thus, for numerous reasons, unnecessary antenna switching should be avoided in traditional Tx diversity. Multi-carrier operation introduces additional difficulties in Tx diversity decisions.

One basis for Tx diversity algorithms is available channel quality information, such as TPC UP/DOWN commands transmitted over F-DPCH from the serving Node-B. However, when uplink Tx diversity is combined with uplink multi-carrier operation (e.g., DC-HSUPA) it is not at all clear how to adapt the single-carrier Tx diversity UE algorithm to multi-carrier operation.

For example, if the UE receives a large number of TPC UP commands for a subset of the uplink carriers, and at the same time receives TPC DOWN for some other carrier(s), it is not obvious whether, and in such case how, the UE should prioritize between the TPC commands associated with the different carriers. This scenario is realistic because different uplink carriers may be associated with different conditions with respect to, e.g., radio propagation, traffic load, interference, and the like. Accordingly, multi-carrier operation introduces significant complexity into, and renders unworkable many prior art algorithms implementing, uplink Tx diversity.

SUMMARY

One or more embodiments of the present invention, described and claimed herein, provide a method and apparatus for selecting one of a plurality of antennas, on a UE implementing Tx diversity in a multi-carrier wireless communication system, for the joint transmission of two or more uplink signals each modulated onto a different carrier frequency, such as when the carriers share a power amplifier. The method and apparatus select an antenna based on channel conditions associated with the carriers, even when prior art Tx diversity methods provide conflicting antenna selection indications.

One embodiment relates to a method of antenna selection by UE implementing Tx diversity in a MC-HSUPA wireless communication network, the UE operative to transmit two or more uplink signals using one antenna, each signal modulated onto a different carrier frequency. For the carrier frequencies to be transmitted using the same antenna, a preferred antenna is associated with each carrier frequency based on feedback received for that carrier when transmitting a signal using a particular antenna. The channel conditions associated with each carrier frequency are assessed. One or more carrier frequencies are selected based on the channel conditions, and the preferred antenna associated with the selected carrier frequency is selected for transmission.

Another embodiment relates to UE implementing Tx diversity in a MC-HSUPA wireless communication network, the UE operative to transmit two or more uplink signals using one antenna, each signal modulated onto a different carrier frequency. The UE includes at least one transmission power amplifier; two or more antennas; and a switching function operative to direct the output of the power amplifier alternatively to one of the antennas. The UE also includes a receiver operative to receive at least channel condition feedback from the network; and an antenna selection function operative to control the switching function to select an antenna for the transmission of two or more signals on different carrier frequencies. The antenna selection function is further operative to associate a preferred antenna with each carrier frequency based on feedback received for that carrier when transmitting a signal using a particular antenna; assess the channel conditions associated with each carrier frequency; select one or more carrier frequencies based on the channel conditions; and select the preferred antenna associated with the selected carrier frequency.

DETAILED DESCRIPTION

In MC-HSUPA operation, the scheduler in the Node-B will give UEs carrier-specific scheduled grants. A scheduled grant is transmitted over the absolute grant channel (E-AGCH), and represents the maximum allowed power ratio between the E-DCH Dedicated Physical Data Control Channel (E-DPDCH) and Dedicated Physical Control Cannel (DPCCH) (see 3GPP TS 25.321). The scheduled grant may be increased or decreased by either the serving Node-B or a non-serving Node-B by relative grants, which are transmitted on the relative grant channel (E-RGCH). The UE's grant level is maintained internally in the UE as a serving grant. The serving grant is adjusted per received relative grants, and is reset to the scheduled grant when a scheduled grant is received over the E-AGCH.

Figure 2:
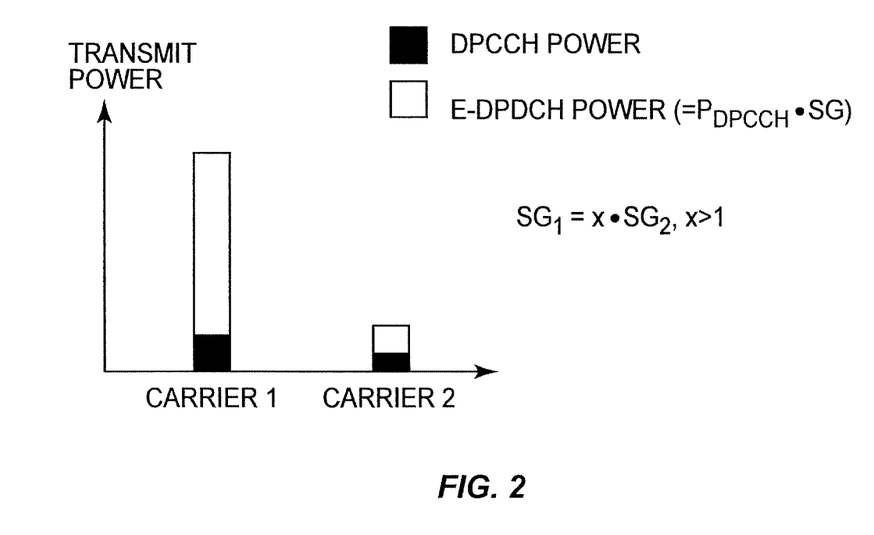
FIG. 2 is a graph of transmit power allocated to two carrier frequencies.

FIG. 2 depicts a case in which the Node-B scheduler has given a high grant on one (or a subset) of the uplink carrier frequencies, and a low grant on the other carrier frequencies. This may be advantageous because it allows the UEs to use carriers with favorable characteristics, and to coordinate the usage between UEs so that intra-cell interference is minimized. In such a case, the UE may be unmotivated to perform a change of transmit antenna based on the TPC commands associated with the carrier(s) having a low grant.

In a UE in which some transmit power amplifiers are shared among two or more carriers, Tx diversity can be directly counterproductive if it means that the carrier on which the UE spends the majority of its power experiences worse channel conditions after switching antennas.

Figure 3:
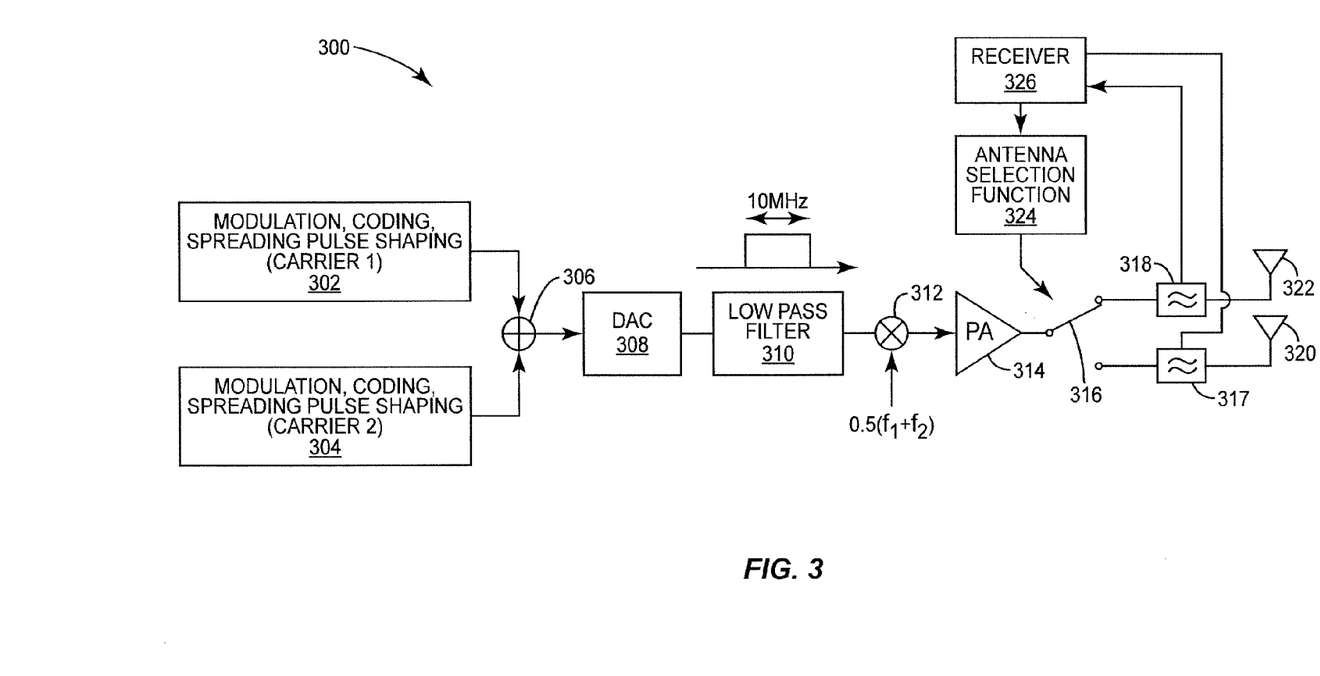
FIG. 3 is a functional block diagram of parts of a DC-HSPA UE transceiver wherein signals modulated onto two carrier frequencies are transmitted using one antenna, using a single power amplifier.

Such a situation may arise in a UE transceiver architecture such as that depicted in FIG. 3, wherein signals modulated onto two or more carrier frequencies share a power amplifier, and the UE implements uplink Tx diversity. In particular, in the UE 300, signals are modulated onto different carrier frequencies in processing blocks 302 (carrier 1) and 304 (carrier 2). The processing blocks 302, 304 perform modulation, coding, spreading pulse shaping, and the like, at the respective carrier frequencies. The modulated signals from the processing blocks 302, 304 are combined at adder 306. The combined signals is converted to analog form in Digital to Analog Converter 308, and low pass filtered at filter 310. Note that the combined signal spans 10 MHz (assuming carrier 1 and carrier 2 are adjacent carrier frequencies, each having a bandwidth of 5 MHz). The combined signal is then upconverted at mixer 312, and amplified by a shared power amplifier 314. A switching function 316 switches the PA 314 output to the transmitter input one of two duplexers 317, 318, each attached to an antenna 320, 322, respectively, for transmission to a serving Node-B.

The switching function 316 is controlled by an antenna selection function 324. According to embodiments of the present invention, the antenna selection function 324 implements Tx diversity by considering channel conditions associated with each carrier frequency, as indicated by feedback, or channel quality metrics, received by a receiver circuit 326, which is connected to the receiver output of duplexers 316, 318. Although FIG. 3 depicts two carrier frequencies sharing one PA 314 and two antennas 320, 322, those of skill in the art will readily recognize that embodiments of the present invention are applicable to Tx diversity in multi-carriers UEs having more than two uplink carrier frequencies, and/or more than two antennas 320, 322, wherein at least two carrier frequencies share one PA 314. Furthermore, those of skill in the art will recognize that the antenna selection function 324 may be implemented in dedicated hardware, such as an Application Specific Integrated Circuit (ASIC); in programmable logic such as an Field Programmable Gate Array (FPGA) with appropriate firmware; as one or more software modules executing on a processor or Digital Signal Processor (DSP); or as any combination of these, as desired or required for any particular implementation.

Figure 4:
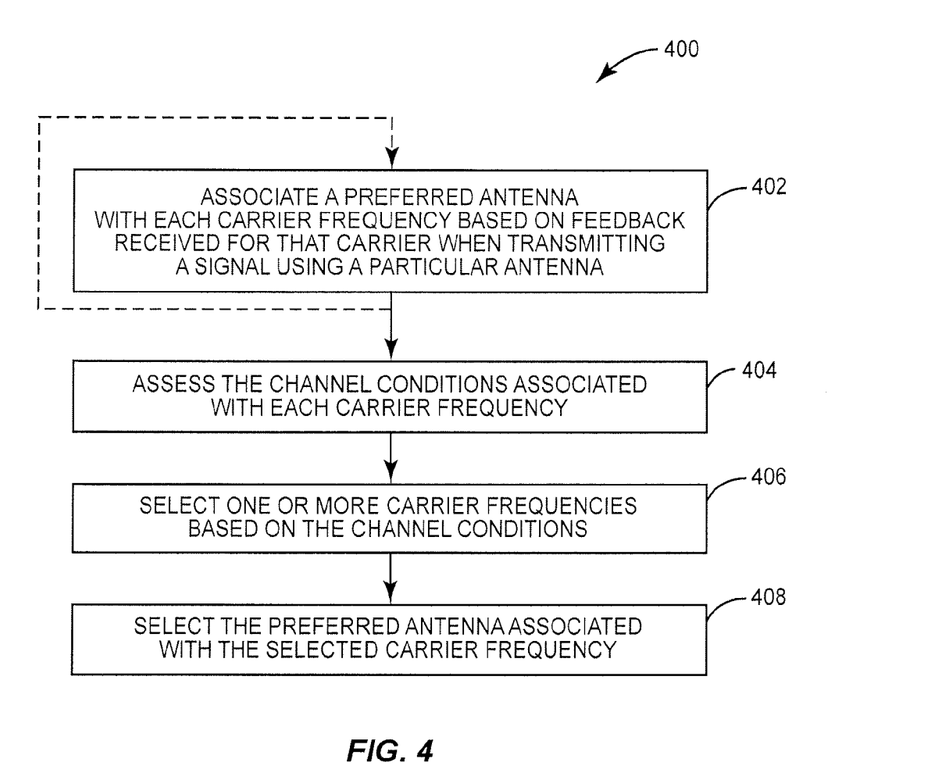
FIG. 4 is a flow diagram of a method of antenna selection for the UE of FIG. 3.

FIG. 4 depicts a method 400 of selecting one antenna 320, 322 from a plurality of available antennas 320, 322 in a UE 300 implementing Tx diversity, wherein two or more signals, each modulated onto a different carrier frequency, are transmitted on the same antenna 320, 322 (for example where the carriers share a PA 314, as depicted in FIG. 3). During operation of the UE 300, as carriers are transmitted on different antennas 320, 322, feedback received by the receiver 326 is analyzed, and a preferred antenna 320, 322 is associated with each carrier frequency (block 402). The feedback may, for example, comprise TPC commands indicating how well a carrier is received by the network when transmitted from different antennas 320, 322. The association of a preferred antenna with each carrier is a dynamic one, and may change during UE 300 operation, based on the carrier feedback, as indicated by the dashed-line loopback path in FIG. 4. Carriers may initially be assigned a preferred antenna 320, 322, randomly or according to a predetermined pattern.

During multi-carrier operation, each carrier operates independently from other carriers. Accordingly, each carrier has its own mechanisms for power control, serving grants, E-TFC selection, HARQ retransmissions, and the like. During operation of the UE 300, the antenna selection function 324 monitors channel quality metrics for each carrier received by the receiver 326, and assesses channel conditions associated with each carrier frequency (block 404). When the UE 300 has two or more pending multi-carrier uplink transmissions—that is, uplink signals modulated onto different carrier frequencies and ready for transmission—that must share an antenna 320, 322 (for example, due to sharing a PA 314), the antenna selection function 324 selects one or more carrier frequencies based on the channel conditions associated with each carrier (block 406). As discussed more fully herein, the step of selecting one or more carrier frequencies may be preformed in several ways, according to different embodiments of the present invention. The preferred antenna 320, 322 associated with a selected carrier frequency is then selected for joint transmission of the multi-carrier signals (block 408).

In one embodiment, the antenna selection function 324 selects an antenna 320, 322 for joint transmission of two or more signals modulated onto different carrier frequencies based on the single carrier that experiences the best channel conditions, as indicated by channel quality metrics received by the receiver 326.

As one non-limiting example, the selection could be based on the TPC commands received on the F-DPCH corresponding to the carrier with the highest serving grant. The rationale for this choice is that the user throughput will depend largely on the carrier with the highest grant. Ensuring a favorable propagation condition for this carrier will additionally result in less interference being generated by the UE 300 (at a given rate). This antenna selection algorithm is compatible with a scheduling strategy of granting each UE 300 a significant grant on only one of its carriers—a scheduling strategy appropriate for certain scenarios, such as when there are many users in the cell served by the serving Node-B. In this case, the conditions on the carrier with the significant grant should be more important than the conditions on other carriers.

Channel quality metrics indicative of channel conditions of the different carriers may include serving grants, as discussed above, or alternatively the scheduled grant issued by the serving Node-B, or as yet another alternative, the total transmit power that the UE 300 utilizes on each respective carrier.

In another embodiment, the antenna selection function 324 selects an antenna 320, 322 for joint transmission of two or more signals modulated onto different carrier frequencies based on a weighted judgment of the conditions on all active carriers sharing the same PA 314. As one non-limiting example, the selection could be based on weighted TPC commands, where the weight associated with the TPC commands for a specific carrier is determined by carrier-specific properties reflecting the individual carrier conditions. As an example, each carrier's TPC commands may be weighted with the ratio of the serving grant for that specific carrier to the sum of all active carriers' serving grants. Alternatively, as discussed above, the weights could be based on the scheduled grants or the total transmit power that the UE 300 utilizes on the respective carriers to be transmitted using the same PA 314.

In yet another embodiment, the antenna selection function 324 selects an antenna 320, 322 for joint transmission of two or more signals modulated onto different carrier frequencies based on the carrier(s) that have a channel quality metric that exceed a threshold at a point in time or over a specific time period. In one embodiment, the threshold is an absolute threshold. An example of this embodiment is using the serving grant as a channel quality metric, and considering for antenna selection a carrier i for which $SG_i$>threshold. In another embodiment, the threshold is a relative threshold. An example of this embodiment, again using the serving grant as a channel quality metric, is to consider a carrier i for which $SG_i/\max_{j \neq i}(SG_j)$>threshold, where $SG_j$ refer to the serving grant associated with carrier j. That is, the ratio of the serving grant of carrier i to the maximum value of the serving grants of carriers j to be transmitted using the same PA 314, other than carrier i. Of course, channel quality metrics such as scheduled grant or total transmit power may be considered in lieu of serving grant. In either case, if the thresholding operation results in two or more carriers being considered, one carrier may be selected according to either previously described embodiment (i.e., selecting the carrier with the best channel conditions, or forming a weighted judgment of channel conditions of the carriers that pass the threshold).

In one embodiment, the threshold could be carrier specific. That is, the network may specify different thresholds (absolute or relative) for different carrier frequencies. These may, for example, be configured by a Radio Network Controller (RNC), and communicated to the UE 300 via L3 signaling. In one embodiment, the network may effectively force the selection of an antenna associated with a predetermined carrier frequency by the values of the thresholds. For example, the so-called primary uplink frequency in the DC-HSUPA concept (which carries both non-scheduled and scheduled traffic) could be favored over the secondary uplink frequency (which only carries scheduled traffic).

In embodiments described herein, the rules for selecting, weighting, or thresholding carriers may, in different embodiments, be considered a UE 300 implementation aspect; predefined in an industry technical standard; determined by the serving Node-B and transmitted to the UE 300 through L1/L2 signaling; or configured by a serving RNC or other network node, and communicated to the UE 300 through L3 signaling (i.e., using Radio Resource Control, or RRC, signaling).

Embodiments of the present invention provide a means for selecting an antenna 320, 322 for joint transmission of two or more signals modulated onto different carrier frequencies, even when the channel quality metrics associated with the carriers are conflicting—e.g., one carrier's channel conditions indicate one antenna and another carrier's channel conditions indicate a different antenna. Embodiments described herein help to secure robust, high performance operation on the carriers that experience the best operating conditions with respect to radio propagation, traffic load, interference, and the like. Furthermore, by reducing the amount of unnecessary antenna switch decisions and related transients in the uplink signal, the overall reception performance is also improved.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of antenna selection by User Equipment (UE) implementing transmit diversity in a Multiple Carrier High Speed Uplink Packet Access (MC-HSUPA) wireless communication network, the UE operative to transmit two or more uplink signals using one antenna, each signal modulated onto a different carrier frequency, wherein the method comprises, for the carrier frequencies to be used in transmitting on the same antenna:

associating a preferred antenna with each carrier frequency based on feedback received for the associated carrier frequency when transmitting a signal using a particular antenna;

assessing one or more quality metrics associated with each carrier frequency;

selecting one or more carrier frequencies based on the assessed one or more quality metrics by forming a weighted sum of the assessed one or more quality metrics for all carrier frequencies to be used in transmitting on a selected antenna; and selecting the preferred antenna associated with the most heavily weighted carrier frequency.

2. The method of claim 1 wherein the feedback for a carrier frequency when transmitting a signal using a particular antenna comprises Transmission Power Control, TPC, commands.

3. The method of claim 1 wherein the quality metric comprises a value of a serving grant, a value of a scheduled grant, or the total transmit power the UE utilizes on the respective carrier frequency.

4. The method of claim 3 wherein forming a weighted sum of the assessed one or more quality metrics further comprises weighting each carrier frequency with a predetermined factor.

5. The method of claim 4 wherein a primary uplink carrier frequency is weighted more heavily than a secondary uplink carrier frequency.

6. The method of claim 1 wherein forming a weighted sum of the assessed one or more quality metrics comprises summing, for all carrier frequencies to be used in transmitting on the selected antenna, first channel quality metrics, each weighted by the ratio of a second channel quality metric for a carrier frequency to the sum of second channel quality metrics for all the carrier frequencies.

7. The method of claim 1 wherein forming a weighted sum of the assessed one or more quality metrics comprises weighting Transmission Power Control (TPC) commands received for each carrier frequency by the ratio of the serving grant for that carrier frequency to the sum of serving grants for all carrier frequencies to be transmitted on the selected antenna.

8. A User Equipment (UE) implementing transmit diversity in a Multiple Carrier High Speed Uplink Packet Access (MC-HSUPA) wireless communication network, the UE operative to transmit two or more uplink signals using one antenna, each signal modulated onto a different carrier frequency, comprising:

at least one transmission power amplifier;

two or more antennas;

a switching function operative to direct the output of the power amplifier alternatively to one of the antennas;

a receiver operative to receive at least channel condition feedback from the network; and an antenna selection function operative to control the switching function to select an antenna for the transmission of two or more signals on different carrier frequencies, the antenna selection function further operative to:

associate a preferred antenna with each carrier frequency based on feedback received for the associated carrier frequency when transmitting a signal using a particular antenna;

assess one or more quality metrics associated with each carrier frequency;

select one or more carrier frequencies based on the assessed one or more quality metrics by forming a weighted sum of the assessed one or more quality metrics for all carrier frequencies to be transmitted on a selected antenna; and select the preferred antenna associated with the most heavily weighted carrier frequency.

9. The UE of claim 8 wherein the feedback for a carrier frequency when transmitting a signal using a particular antenna comprises Transmission Power Control (TPC) commands.

10. The UE of claim 8 wherein the quality metric comprises a value of a serving grant, a value of a scheduled grant, or the total transmit power the UE utilizes on the respective carrier frequency.

11. The UE of claim 8 wherein forming a weighted sum of the assessed one or more duality metrics comprises summing, for all carrier frequencies to be used in transmitting on the selected antenna, first channel quality metrics, each weighted by the ratio of a second channel quality metric for a carrier frequency to the sum of the second channel quality metrics for all the carrier frequencies.

12. The UE of claim 11 wherein forming a weighted sum of the assessed one or more quality metrics comprises weighting Transmission Power Control (TPC) commands received for each carrier frequency by the ratio of the serving grant for that carrier frequency to the sum of serving grants for all carrier frequencies to be used in transmitting on the selected antenna.

13. The UE of claim 11 wherein forming a weighted sum of the assessed one or more quality metrics further comprises weighting each carrier frequency with a predetermined factor.

14. The UE of claim 13 wherein a primary uplink carrier frequency is weighted more heavily than a secondary uplink carrier frequency.

* * * * *